US008413354B2

(12) United States Patent
Xiang et al.

(10) Patent No.: US 8,413,354 B2
(45) Date of Patent: Apr. 9, 2013

(54) SYSTEM AND METHOD FOR COMMUNICATION HANDOFF

(75) Inventors: Justin Zengjun Xiang, Vernon Hills, IL (US); Hinghung Anthony Chan, Plano, TX (US)

(73) Assignee: FutureWei Technologies, Inc., Plano, TX (US)

( * ) Notice: Subject to any disclaimer, the term of this patent is extended or adjusted under 35 U.S.C. 154(b) by 289 days.

(21) Appl. No.: 12/848,586

(22) Filed: Aug. 2, 2010

(65) Prior Publication Data

US 2011/0032901 A1 Feb. 10, 2011

Related U.S. Application Data

(60) Provisional application No. 61/231,621, filed on Aug. 5, 2009.

(51) Int. Cl.
*H04W 4/00* (2009.01)

(52) U.S. Cl.
USPC .......................................................... 37/331

(58) Field of Classification Search .................. 370/331, 370/328, 342, 352, 389, 338, 401; 455/436; 709/201, 203, 223
See application file for complete search history.

(56) References Cited

U.S. PATENT DOCUMENTS

| 6,714,515 | B1 | 3/2004 | Marchand |
| 6,839,356 | B2 | 1/2005 | Barany et al. |
| 7,583,646 | B2 | 9/2009 | Hua et al. |
| 7,624,429 | B2 | 11/2009 | Van Ackere et al. |
| 7,849,195 | B2* | 12/2010 | Jokela et al. ................... 709/227 |
| 2003/0233572 | A1 | 12/2003 | Van Ackere et al. |
| 2008/0259869 | A1 | 10/2008 | Wang et al. |
| 2009/0034536 | A1 | 2/2009 | Morand et al. |
| 2010/0254347 | A1* | 10/2010 | Muhanna et al. ............. 370/331 |

FOREIGN PATENT DOCUMENTS

| CN | 101010924 A | 8/2007 |
| WO | WO 2008/067227 A1 | 6/2008 |
| WO | WO 2008/072687 A1 | 6/2008 |

OTHER PUBLICATIONS

"International Search Report and Written Opinion," International Application No. PCT/CN2010/075744, Applicant: Huawei Technologies Co., Ltd., et al., mailing date:Nov. 11, 2010, 12 pages.

* cited by examiner

*Primary Examiner* — Chi Pham
*Assistant Examiner* — Alexander O Boakye
(74) *Attorney, Agent, or Firm* — Slater & Matsil, L.L.P.

(57) ABSTRACT

A system and method for performing a handoff is presented. A preferred embodiment comprises initiating a pre-handoff registration of a piece of user equipment prior to the actual handoff in order to pre-register the piece of user equipment with the new access network. During the handoff a tunnel may be created from the original access network to the new access network in order to tunnel data packets that would otherwise have been lost prior to the completion of the handoff.

17 Claims, 5 Drawing Sheets

SYSTEM AND METHOD FOR COMMUNICATION HANDOFF

This application claims the benefit of U.S. Provisional Application No. 61/231,621, filed on Aug. 5, 2009, entitled System and Method for Optimized Fast Handoff in ID/Locator Split Based Networks, which application is hereby incorporated herein by reference.

TECHNICAL FIELD

The present invention relates generally to a system and method of wireless communications and, more particularly, to a system and method for a handoff in an ID/locator split based network.

BACKGROUND

With the further evolution of fixed-mobile broadband networks beyond 3G/4G, there is a great need to further flatten the future broadband network architecture to improve network efficiency and performance, to reduce network capital expenditure and operational expenditure, and to enable new advanced features and services. Splitting the Identity (ID) and locator (LOC) of a communication device may be used to help enable an ultra flat network architecture and better support of mobility, security and multi-homing in a network environment.

In previous generation networks, a communication device's ID and location were usually tied to the communication device's address, for example, an Internet Protocol (IP) address. An IP address describes the topological location of the host and is also used for identifying the host's interface, which is very inefficient especially when mobility is involved. When tied to an IP address, the communication device's ID and location are typically bound together and if the communication device's location were to change, such as when the communication device roams onto a different network (a visitor network), then the communication device's ID would also change.

The requirements in the Internet have changed very much with the increasing number of mobile devices, the use of multi-homing and provider-independent (PI) IP addresses, and the other new uses of the Internet. These new challenges are only met with difficulty where the same IP address has traditionally been used both as an identity for transport and application and as a locator for network routing. The difficulty here is that transport sessions which use the same IP address are disrupted when changes in the network routing also causes changes in the IP address.

With ID/Locator split, a communication device's ID and location may no longer be tied together. Then, when a communication device's location changes, it may not be necessary to change the communication device's ID. In other words, the routing IP address may be changed without changing the ID, which may help to prevent a disruption of the transport session. This may simplify network operation, thereby potentially reducing network capital expenditure and operational expenditure since hardware and software support requirements may be reduced.

As a User Equipment (UE) moves around, it may become necessary for the UE to participate in a handoff that results in the UE changing from an old serving network to a new serving network. A long delay handoff may result in a partial interruption of service for the UE or even the dropping of the UE's connection, either of which may produce an undesirable user experience.

Therefore, what is needed is a system and method for improving the handoff of a UE so that service is minimally impacted when the UE participates in a handoff.

SUMMARY OF THE INVENTION

These and other problems are generally solved or circumvented, and technical advantages are generally achieved, by preferred embodiments of the present invention which provide for an optimized handoff of a piece of user equipment from a first access network to a second access network.

In accordance with a preferred embodiment of the present invention, a communication network comprises a control network system comprising a home subscriber database, the home subscriber database configured to bind an identity of a first piece of user equipment to a locator of the first piece of user equipment.

In accordance with another preferred embodiment of the present invention, a method of communicating data, the method comprising transmitting a pre-handoff registration request from a first gateway in a control network to a second gateway in the control network, and a handoff is initiated from the first gateway to the second gateway after the pre-handoff registration request.

In accordance with another preferred embodiment of the present invention, a method of transmitting data comprises transmitting a tunnel request from a first gateway in a control network to a second gateway in the control network. A tunnel is set up between the first gateway and the second gateway, and data packets are transmitted from the first gateway to the second gateway after a handoff from the first gateway to the second gateway has been initiated and prior to the handoff being complete.

An advantage of an embodiment is to help optimize a handoff of a piece of user equipment from a first access network to a second access network.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a hand-off in a ID/locator split communication network. The invention may also be applied, however, to other networks.

Figure 1:
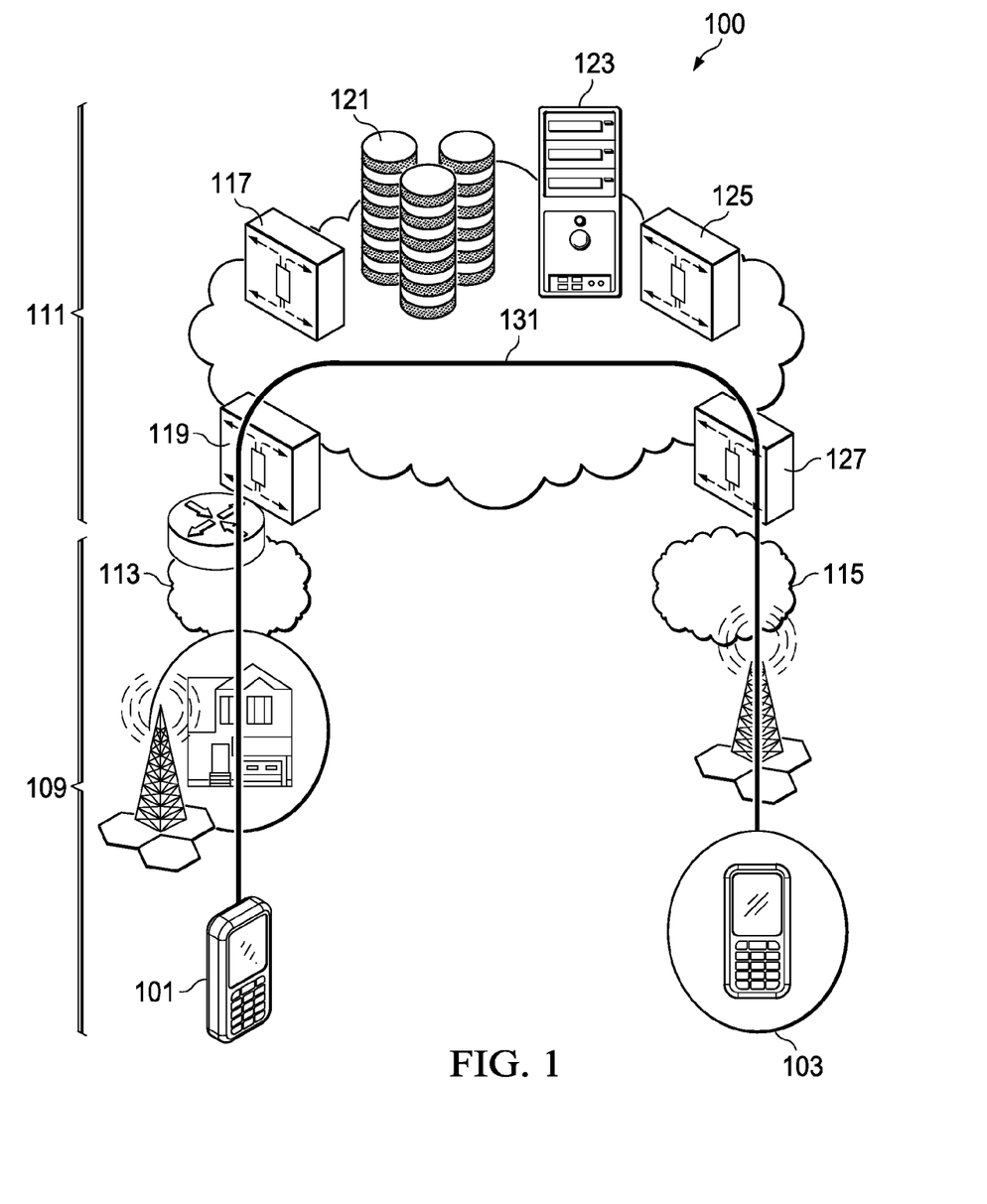
FIG. 1 illustrates a communication network that may be used to transmit data in accordance with an embodiment of the present invention.

With reference now to FIG. 1, there is shown a communications network 100 that may be used to transmit data between a first user equipment (UE) 101 and a second user equipment (UE) 103. The communications network 100 may comprise an access network subsystem 109 and a control network subsystem 111 (or core network). The access network subsystem 109 may comprise a first access network 113 which helps to permit the first UE 101 to connect and communicate with the control network subsystem 111 in order to access information, execute applications, or the like. The access network subsystem 109 may also comprise a second access network 115 which similarly helps to permit the second UE 103 to connect and communicate with the control network subsystem 111 in order to access information, execute applications, or the like.

The first access network 113 and the second access network 115 may each include an access network environment, such as a home network, an enterprise network, a wide area network, combinations of these, or the like. Additionally, the first access network 113 and the second access network 115 may comprise any fixed access technology based networks such as DSL, Cable, WiFi, PON, xPON, combinations of these, or the like. Alternatively, the first access network 113 and the second access network 115 may comprise mobile access technology based networks, such as GSM, CDMA, GPRS, EDGE, UMTS, HSPA/HSPA+, EV-DO, WiMAX, LTE, LTE+, 3GPP, 3GPP2, WLAN, combinations of these, and the like.

The communication network 100 may be, e.g., a heterogeneous network, in which the first access network 113 and the second access network 115 may be different types of network. For example, the first access network 113 may comprise a home network while the second access network 115 may comprise a cellular network. However, with the use of elements of the control network subsystem 111 (as further described below), the first access network 113 and the second access network 115 may be intertwined in such a way that the first access network 113 and the second access network 115 operate together.

Additionally, the communications network 100 may utilize an ultra flat fixed-mobile converged broadband network architecture. This type of architecture allows the first UE 101 (discussed further below) to originate a data communication, such as a telephone call, within the second network 107, which may be a fixed network, and then transfer to a mobile network while maintaining the data communication (such a transfer is described below with respect to FIG. 2).

However, as one of ordinary skill in the art will recognize, the communications network 100 described above is merely illustrative, and the description is not intended to limit the communication network 100 to a heterogeneous network with an ultra flat fixed-mobile converged broadband network architecture. Any other suitable network, such as Content delivery network (CDN), content centric network (CCN), Future Internet, Next Generation Network (NGN), or the like, may alternatively be utilized and all such networks are fully intended to be included within the scope of the present inventions.

The first UE 101 may be in communication with the first access network 113 and may be a host, a terminal, an access terminal, a mobile station, a subscriber, a subscriber unit, a subscriber terminal, combinations of these, or the like. The first UE 101 may have an identity that is unique to the first UE 101 and will not change as the first UE 101 moves away from the first access network 113 onto, e.g., a third access network 201 (not shown in FIG. 1 but shown and described in FIG. 2). Additionally, the first UE 101 may also have a dynamic locator (such as an IP address) assigned to it by the access network to which the first UE 101 is currently associated with (the first access network 113), and, as such, the first locator may change as the first UE 101 moves away from the first access network 113 onto, e.g., the third access network 201.

The second UE 103 may be in communication with the second access network 115 and may be similar to the first UE 101 (described above). However, as one of ordinary skill in the art will recognize, while the second UE 103 may be similar to the first UE 101, the second UE 103 may also be different from the first UE 101 while still remaining within the scope of the present embodiments. Any suitable combination of types of UEs may be used for the first UE 101 and the second UE 103.

The control network subsystem 111 may comprise a policy server 117, a first control nodes/gateway (CN/GW) 119, a second CN/GW 127, an enhanced home subscriber system/server (HSS+) 121, an application server (AS) 123, and an authentication, authorization, and accounting server (AAA) 125. The policy server 117 may set and communicate different policies to control and operate the network, such as subscriber access control, bandwidth control, quality of service (QoS) decisions, and the like. The policy server 117 may, e.g., be a media policy server, an application policy server, combinations of these, or the like.

The first CN/GW 119 may function as a generalized control node for communications between the first access network 113 and the control network subsystem 111. The first CN/GW 119 supports a split of the identity and the locator and may also operate to support network policy, device/user/host attach, device/user/host detach, locator update, security, mobility control/support, other signaling/control related functions, combinations of these, and the like. The first CN/GW 119 may also store the binding information of the identity and the locator of the first UE 101 and may function as a generalized gateway and router that supports identity/locator split, network policy enforcement, security, mobility support, border router, and other bearer and interworking related functions.

The second CN/GW 127 may function as a generalized control node for communications between the second access network 115 and the control network subsystem 111. The second CN/GW 127 also supports a split of the identity and the locator of the second UE 103 and may also operate to support network policy, device/user/host attach, device/user/host detach, locator update, security, mobility control/support, other signaling/control related functions, combinations of these, and the like. The second CN/GW 127 may also store the binding information of the identity and the locator of the second UE 103 and may function as a generalized gateway and router that supports identity/locator split, network policy enforcement, security, mobility support, border router, and other bearer and interworking related functions.

The HSS+ 123 may be responsible for storing and managing subscriber related information (such as subscriber identification, subscriber security, subscriber profile, etc.). The HSS+ 123 also operates so as to hide the heterogeneity of the system so that the communication system 100 may operate similar to a single network. As such, the HSS+ 123 may translate and integrate the various heterogeneous information such that the various networks can operate together.

Additionally, the HSS+ 123 may maintain a subscriber database that maintains the current location, and, therefore, the current locator (such as the IP address) of the first UE 101 as the first UE 101 travels from, e.g., the first access network 113 to a third access network 201 (discussed further below with respect to FIG. 2). The subscriber database may bind the identity of the first UE 101 to the current locator of the first UE 101. This binding may then be communicated as desired to the remainder of the control network subsystem 111 (e.g., to the first CN/GW 119, the second CN/GW 127, etc.).

The AS 123 may host applications that can be executed on first UE 101. The AS 123 may execute an application, such as presence discovery (finding out whether a user is available for communication and, if so, which device is used and what are the capabilities of the device), on its own server in order to relieve the first UE 101 from the hardware requirements of the application. During the execution of the applications, or else after the application has been fully executed, the results from the application may be forwarded to the first UE 101 as desired.

The AAA 125 may control what network resources users have access to and to keep track of the activity of users over the communication network 100. The AAA 125 may identify (authenticate) the user, usually based on a username and password. Once the AAA 125 has identified the user, the AAA 125 may grant or deny the user access (authorize) to network resources. Finally, the AAA 125 may keep track of the user's activity (accounting) while the user accesses the network resources, including the time spent accessing network resources as well as which resources are being accessed.

Also illustrated in FIG. 1 is a transmission of, e.g., a data packet from the first UE 101 to the second UE 103. The path of this transmission is illustrated by line 131. As illustrated, the data packet may be initially transmitted by the first UE 101 (which may also be called an originating UE) and travels through the first access network 113 to the first CN/GW 119 (which may also be called an originating CN/GW/Router, or OCGR). The first CN/GW 119, with the help of the elements of the control network subsystem 111, may forward the data packet to the second CN/GW 127 (which may be also be called a terminating CN/GW/Router, or TCGR), which then forwards the data packet to the second UE 103 (which may also be called the terminating UE).

Figure 2:
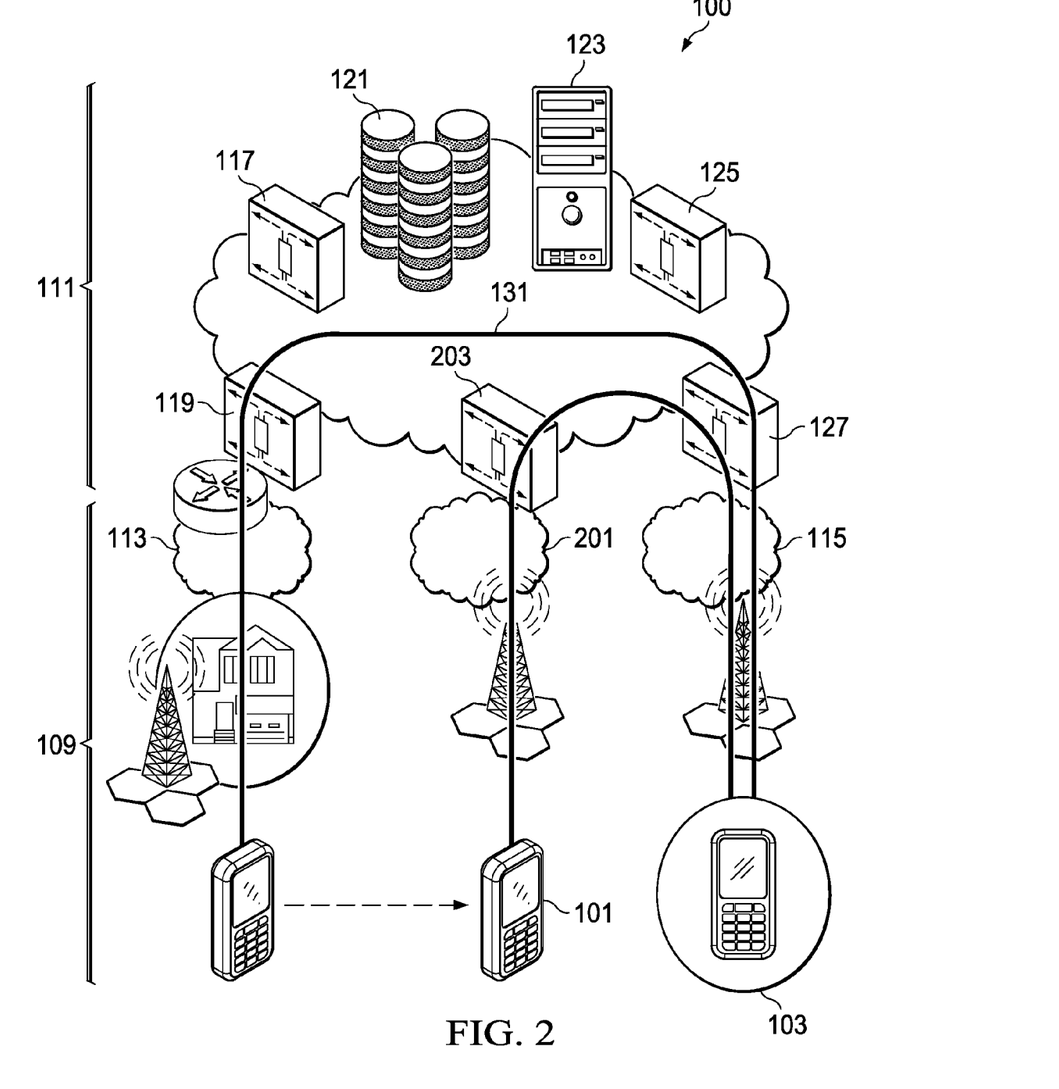
FIG. 2 illustrates a movement of a piece of user equipment from a first access network to a second access network in accordance with an embodiment of the present invention.

FIG. 2 illustrates a movement of the first UE 101 from the first access network 113 to a third access network 201. The third access network 201 may be similar to the first access network 113 (described above with respect to FIG. 1), but may alternatively be dissimilar from the first access network 113. Any suitable access network may be utilized as the third access network 201 as long as it provides communication between the first UE 101 and the control network subsystem 111 and supports a split between the locator and identity of the first UE 101.

Additionally, the third access network 201 may be in communication with the control network subsystem 111 through, e.g., a third CN/GW 203 (which may also be called a New CN/GW/Route, or NCGR). The third CN/GW 203, similar to the first CN/GW 119 (described above with respect to FIG. 1), may function as a generalized control node for communications between the third access network 201 and the control network subsystem 111. The third CN/GW 203 supports a split of the identity and the locator and may also operate to support network policy, device/user/host attach, device/user/ host detach, locator update, security, mobility control/support, other signaling/control related functions, combinations of these, and the like. The third CN/GW 203 may also function as a generalized gateway and router that supports identity/locator split, network policy enforcement, security, mobility support, border router, and other bearer and interworking related functions In an embodiment, prior to a handoff routine being initiated to handoff the first UE 101 from the first access network 113 to the third access network 201, the first UE 101 may be initially registered with the third access network 201 while the first UE 101 remains being served by the first access network 113. Such a pre-handoff registration helps to reduce the latency and minimize any loss of data packets, service interruptions, and the like.

Figure 3:
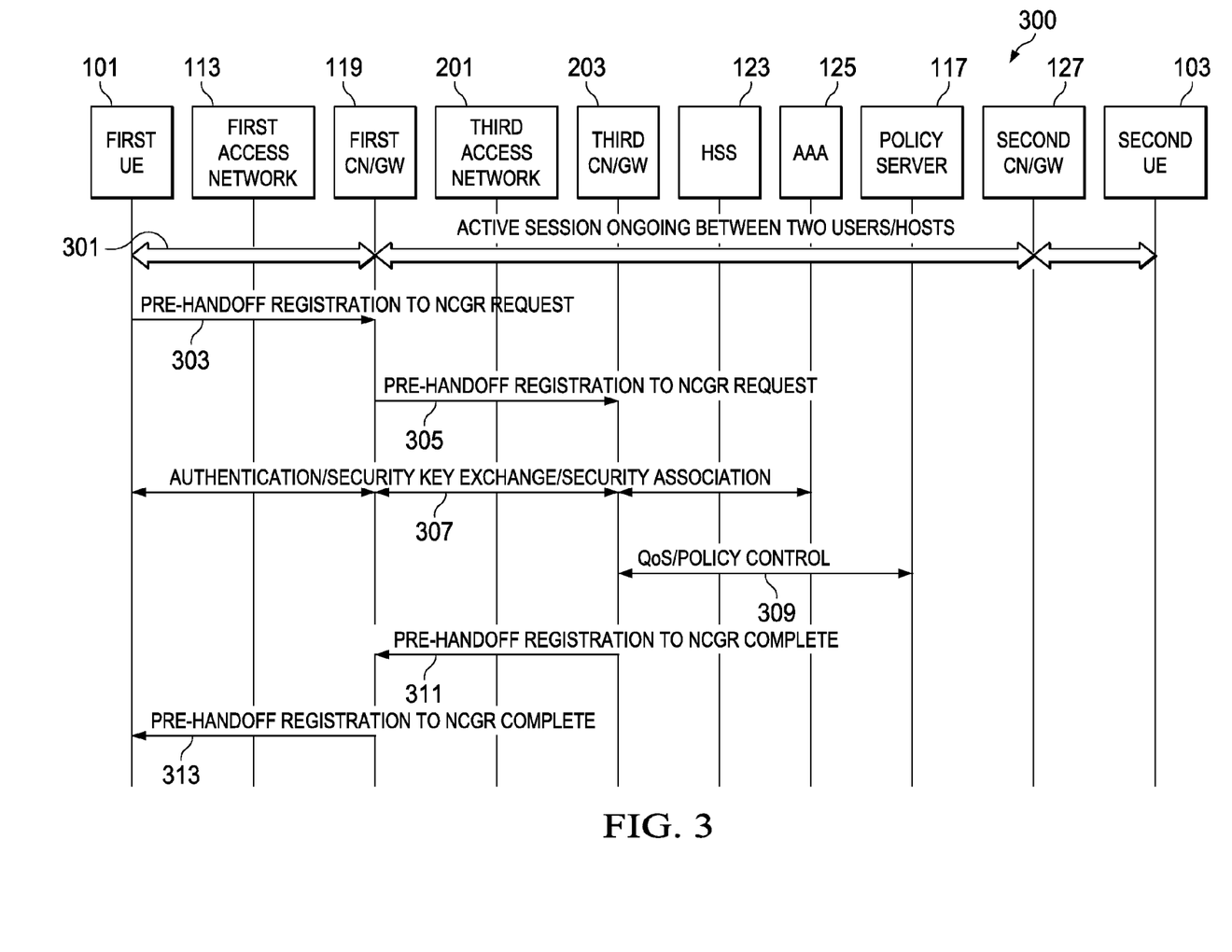
FIG. 3 illustrates a message exchange that may be used in a pre-handoff registration in accordance with an embodiment of the present invention.

FIG. 3 illustrates a message exchange 300 between the devices and components of, e.g., the communications network 100 illustrated in FIG. 2 that may be used in the pre-handoff registration. In the pre-handoff registration described herein, the first UE 101 may establish the ID/locator mapping in the third access network 201 to which it will handoff prior to the actual handoff, and the control network subsystem 111 may update the new identity-locator mapping to get ready for the handoff.

The pre-handoff registration may begin when there are indications that handoff is desired or the need to handoff is imminent while the first UE 101 is in an active session with the second UE 103 (shown as transmission 301). The active session 301 between the first UE 101 and the second UE 103 may originally be transmitted, e.g., through the first CN/GW 119, the second CN/GW 127, and to the second UE 103 (as illustrated above in FIG. 1).

The first UE 101 may send a pre-handoff registration message to the third CN/GW 203 request message to the first CN/GW 119 (illustrated as transmission 303). The first CN/GW 119 may recognize that the pre-handoff registration to the third CN/GW 203 request message is a request to pre-handoff register the first UE 101 to the third CN/GW 203 through, e.g., a tunnel or other type of interface between the first CN/GW 119 and the third CN/GW 203. Therefore, the first CN/GW 119 may pass the request message to the third CN/GW 203 (illustrated as transmission 305).

The third CN/GW 203 may initiate a registration procedure, such as an authentication/security key exchange/security association, for registering the first UE 101 to the third access network 201, which communicates with the third CN/GW 203 (illustrated as transmission 307). This registration procedure may include authentication, authorization, secure key exchanges, creating security associations, and the like, for the first UE 101. During the registration procedure, the third CN/GW 203 may also send an inquiry to the policy server 117 in order to obtain policy control and Quality of Service (QoS) settings for the first UE 101 (illustrated as transmission 309).

Once the first UE 101 has been successfully registered with the third access network 201 (which is in communication with the third CN/GW 203), the third CN/GW 203 may send a pre-handoff registration to the third CN/GW 203 complete message to the first CN/GW 119 (illustrated as transmission 311). The first CN/GW 119 may pass the pre-handoff registration to the third CN/GW 203 complete message to the first UE 101 (illustrated as transmission 313).

Once the pre-handoff registration has been completed, the first UE 101 is prepared for a handoff. However, as one of ordinary skill in the art will recognize, a handoff does not necessarily occur after the pre-handoff registration has completed. For example, the first UE 101, after recognizing that a handoff may occur and initiating the pre-handoff registration, may determine that the handoff only brings marginal improvements and is really not helpful to the transfer of data packets. As such, the first UE 101 may not initiate a handoff, even though the pre-registration handoff has already occurred.

Figure 4A:
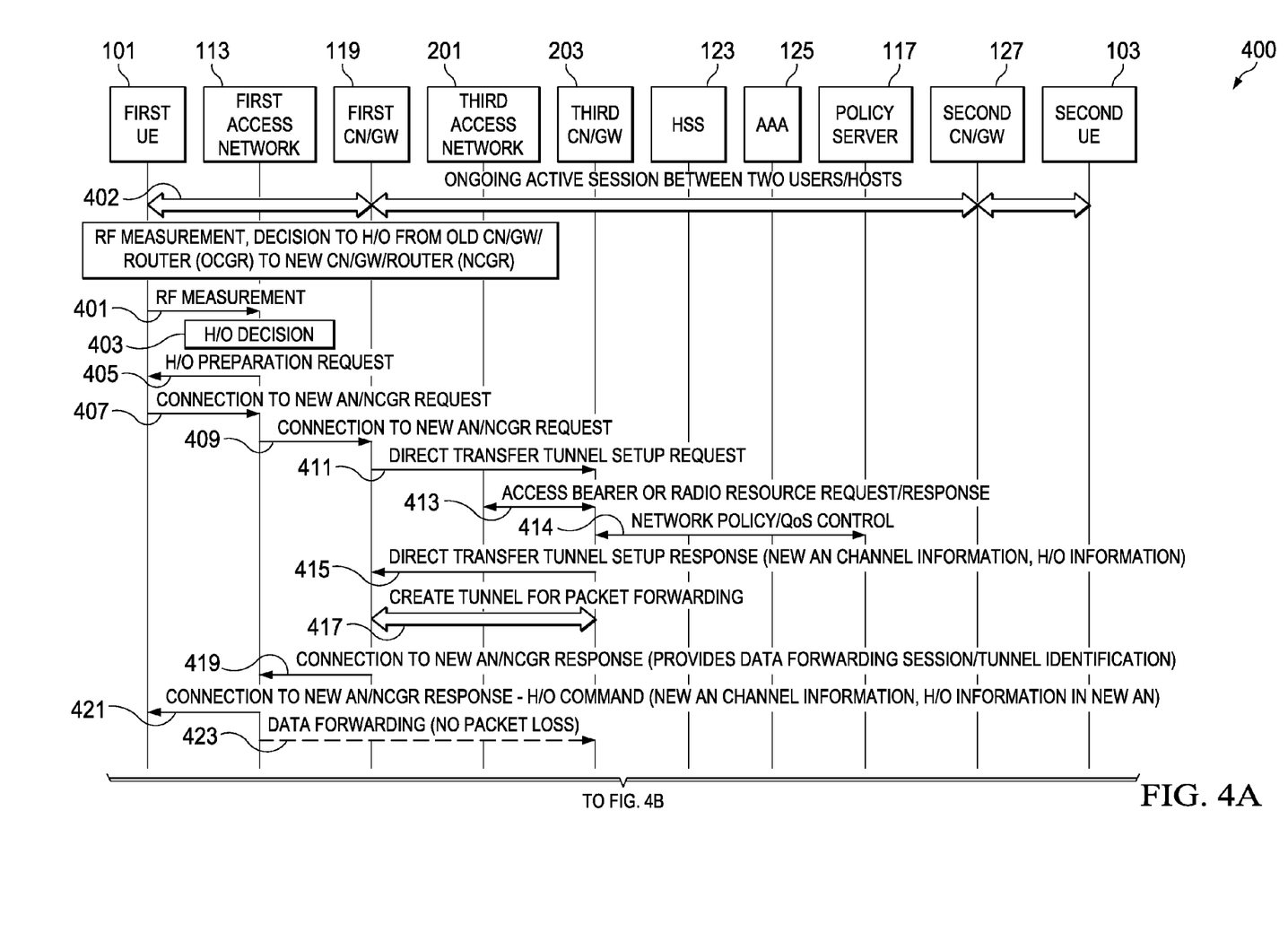
FIG. 4 illustrate a message exchange that may be used in a handoff in accordance with an embodiment of the present invention.
Figure 4B:
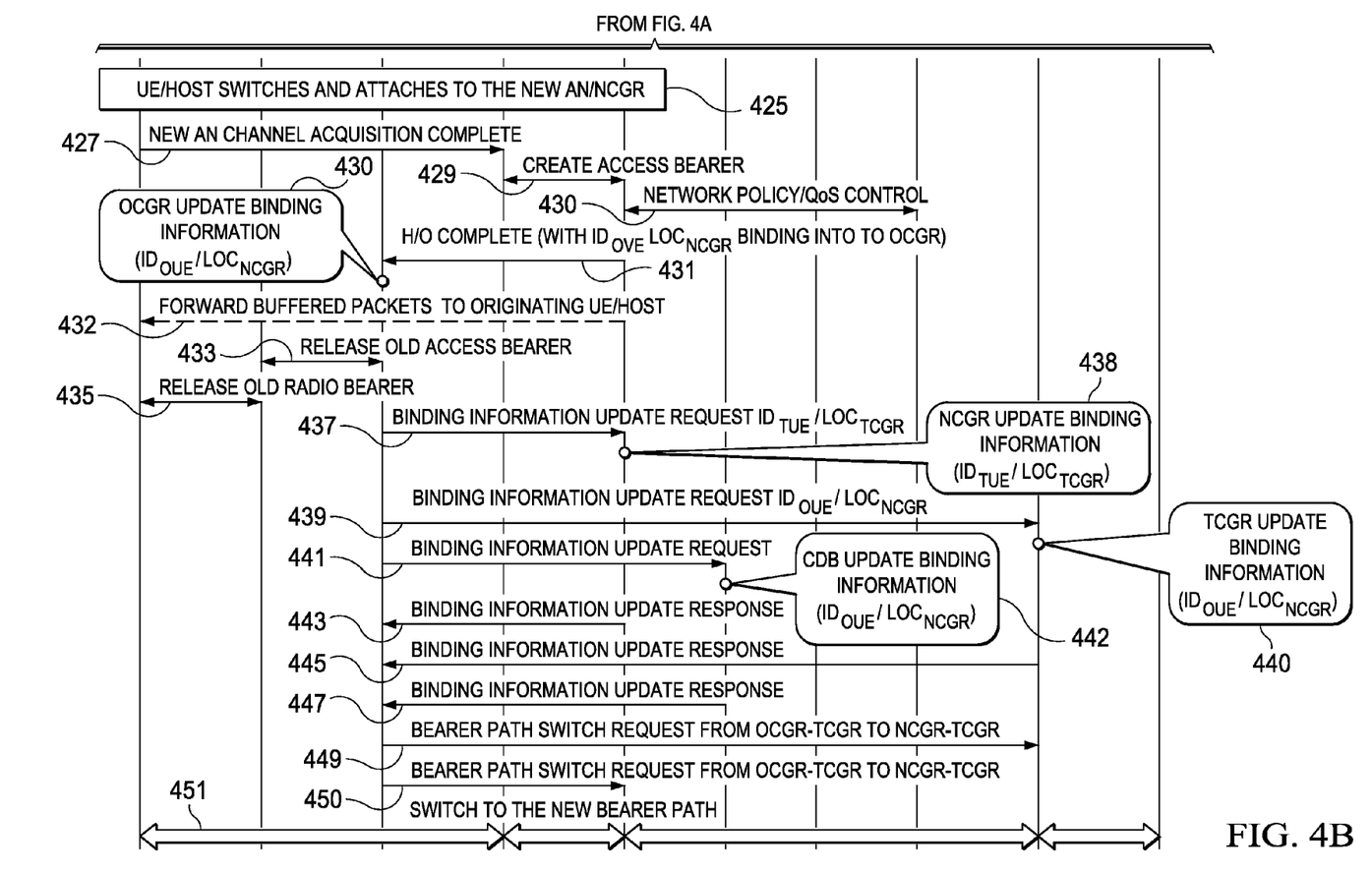

FIG. 4 illustrates a second message exchange 400 for a handoff procedure that may begin once the pre-handoff registration has been completed. In an embodiment, the handoff may generate a connection, such as a direct tunnel, between the first CN/GW 119 and the third CN/GW 203 in order to forward data packets prior to the completion of the handoff. The second message exchange 400 illustrates illustrative messages that may be exchanged between the devices and network components in the communications network 100 (illustrated above with respect to FIG. 2).

The first UE 101 may be in an active session with the second UE 103 (illustrated in FIG. 4 by arrows 402). As the first UE 101 detects that received signals and overall service quality from the first access network 113 is deteriorating, the first UE 101 may send a radio frequency (RF) measurement message to the first access network 113 (illustrated as transmission 401). The first access network 113 may perform the RF measurements as requested and make a determination 403 that a handoff (H/O) to a new access network, such as the third access network 201, is needed or desired.

However, as one of ordinary skill in the art will recognize, the RF measurement is only one suitable reason why a handoff may be necessary and the above description is not meant to limit the present embodiments in any fashion. Any other suitable reason or trigger may alternatively be utilized and all such triggers are fully intended to be included within the scope of the present embodiments.

In an embodiment, once the first access network 113 has made a determination that a handoff is desirable, the pre-handoff registration (described above with respect to FIG. 3) may be initiated at any point prior to the actual handoff being initiated. If the pre-handoff registration has already been performed (for example if the pre-handoff registration had been performed and a decision was subsequently made to not proceed with the handoff), then the first access network 113 may skip the pre-handoff registration described above with respect to FIG. 3 and proceed with the handoff initiation.

The first access network 113 may send a handoff preparation request message to the first UE 101 (illustrated as transmission 405). The handoff preparation request message may result in the first UE 101 initiating a pre-handoff preparation process in order to set up the third CN/GW 203 and to create a packet forwarding tunnel or interface between the third CN/GW 203 and the first CN/GW 119 prior to handing off the first UE 101 from the first access network 113 to the third access network 201 in order to minimize the handoff latency and also to prevent the loss of packets during the handoff. The pre-handoff preparation process may include radio and access network bearer setup, acquire radio channel information at the third CN/GW 203, combinations of these, or the like.

The first UE 101 may send a connection to the third access network 201 request message to the first access network 113 (illustrated as transmission 407). The first access network 113 may recognize that the third access network 201 request message from the first UE 101 is a pre-handoff preparation request to the third CN/GW 203 and forwards the third access network 201 request message to the first CN/GW 119 (illustrated as transmission 409), which passes the third access network 201 request message to the third CN/GW 203.

The first CN/GW 119 may request the third CN/GW 203 to create a connection such as a tunnel between the first CN/GW 119 and the third CN/GW 203 (illustrated as transmission 411). The connection may be used to exchange information between the first CN/GW 119 and the third CN/GW 203 during the pre-handoff preparation procedure. The connection may also be used to forward packets from the first CN/GW 119 to the third CN/GW 203 during a handoff transition period until all of the bearers are set up in the third CN/GW 203 for the first UE 101. In other words, the connection may be used until the first UE 101 officially switches from the first CN/GW 119 to the third CN/GW 203. Such forwarding helps to ensure that no data packets in the active session between the first UE 101 and the second UE 103 are lost.

The pre-handoff method establishes a tunnel between an old gateway/router to a new gateway/router so that the old gateway/router may continue to exercise any required control functions as the new gateway/router has started receiving packets via the old gateway, i.e., the old gateway/router acts as the anchor gateway/router during the handoff process. Further transfer of these functions may happen after the new gateway is fully able to process all control functions in addition to the data.

The third CN/GW 203 may initiate procedures between the third CN/GW 203 and the third access network 201 to obtain information for use in establishing access bearer and reserving radio resources in the third access network 201 and the third CN/GW 203 for the first UE 101 (illustrated as transmission 413). The third CN/GW 203 may also make an inquiry to the policy server 117 on network QoS and policy control settings for the first UE 101 (illustrated as transmission 414). The third CN/GW 203 may send to the first CN/GW 119 a confirmation message, wherein the confirmation message indicates the set up of the connection (illustrated as transmission 415). The confirmation message may also contain radio channel information in the third access network 201, along with other handoff information. The confirmation message along with the additional information may be passed on to the first UE 101.

The connection may then be created between the first CN/GW 119 and the third CN/GW 203 in order to forward data packets from the first CN/GW 119 to the third CN/GW 203 during the handoff transition period until all of the bearers are set up in the third CN/GW 203 for the first UE 101 (represented in FIG. 4 as arrow 417). The handoff transition period may remain active until the first UE 101 officially switches from the first CN/GW 119 to the third CN/GW 203. The first CN/GW 119 may send a connection to third access network 201 response message to the first access network 113 (illustrated as transmission 419). In the connection to third access network 201 message, radio channel information for the first UE 101 in the third access network 201 along with other handoff information, such as data forwarding session/tunnel ID, may be included and may be passed over to the first UE 101 in the first CN/GW 119 through the first access network 113.

The connection to the third access network 201 response message may be passed on to first UE 101 by the first access network 113 along with other handoff related information (illustrated as transmission 421). The connection to the third access network 201 response message may also serve as a handoff command for the first UE 101 to switch from the first access network 113 to the third access network 201, and may also trigger forwarding of data packets from the first access network 113 and the first CN/GW 119 to the third CN/GW 203 (represented in FIG. 4 by arrow 423). The first access network 113 and the first CN/GW 119 may start the packet forwarding process to the third CN/GW 203 right after the connection to third access network 210 response message (sent as transmission 421). In this way, data packet loss may be minimized after the first UE 101 shuts off (tunes away) its radio in the first access network 113 and switches to the first access network 201. This forwarding process may continue until the first CN/GW 119 triggers the bearer path switch in a subsequent action after all the binding information has been updated and acknowledged, and bearers are set up in the third CN/GW 203.

The first UE 101 may switch 425 to the third access network 201 based on the handoff information, e.g. the handoff information received in transmission 421, by sending a third access network 201 channel acquisition complete message (illustrated as transmission 427) to the third access network 201 immediately after receiving the connection to the third access network 201 response message transmitted in transmission 421. The third access network 201 may initiate a new access bearer creation between the third access network 201 and the third CN/GW 203 (illustrated as transmission 429). While new access bearers are created, the third CN/GW 203 may make an inquiry from the policy server 117 on network QoS and policy control settings for the first UE 101 in the third CN/GW 203 (illustrated as transmission 430).

Upon completion of the access bearer set up between the third access network 201 and the third CN/GW 203, the third CN/GW 203 may send a handoff complete message to the first CN/GW 119 with binding information of the identity of the first UE 101 and the locator of the third CN/GW 203 (illustrated as transmission 431). The first CN/GW 119 (or OCGR) updates the binding information of the identity of the first UE 101 and the locator of the third CN/GW 203 by removing the old binding information of the identity of the first UE 101 and the locator of the third CN/GW 203 (represented in FIG. 4 by box 430). The third CN/GW 203 may start forwarding the buffered data packets received earlier from the first CN/GW 119 (in transmission 421, for example) through the third access network 201 to the first UE 101 (illustrated as transmission 432). Old access bearers between the first UE 101, the first access network 113, and the first CN/GW 119 may then be released (illustrated as transmissions 433 and 435).

While data packets are being tunneled from the second UE 103 to the first UE 101 through the path comprising the second access network 115, the first CN/GW 119, the third CN/GW 203, and the third access network 201, procedures to update and obtain the acknowledgement of related binding information in various anchor points throughout the communication network 100 may be implemented. Each of these procedures is described in the following paragraphs.

The pre-handoff process may also update the identity/locator mapping system and any other system providing other services such as account and billing. Route optimization may then transfer all the control functions for the handed over session from the first CN/GW 119 to the third CN/GW 203.

The first CN/GW 119 may send a binding info update request to the third CN/GW 203 with binding information of the identity of the first UE 101 and the locator of the third CN/GW 203 since this binding info is a new entry for the third CN/GW 203 and the third CN/GW 203 has not interacted with the second UE 103 before (illustrated as transmissions 437). Upon receipt of this binding information update from the first CN/GW 119, the third CN/GW 203 (NCGR) may update the binding information (represented in FIG. 4 by clock 438). The first CN/GW 119 may also send a binding info update request to the second CN/GW 127 with the binding information of the identity of the first UE 101 and the locator of the third CN/GW 203 since the first UE 101 is now served by the third CN/GW 203 (illustrated as transmission 439). The second CN/GW 127 may then update the binding information (represented in FIG. 4 by box 440).

The first CN/GW 119 may also send a binding info update request to the HSS+ 123 with the binding information of the identity of the first UE 101 and the locator of the third CN/GW 203 since the first UE 101 is now served by the third CN/GW 203 (illustrated as transmissions 441). The HSS+ 123 may then update the binding information (represented in FIG. 4 by box 442). The first CN/GW 119 may receive acknowledgement responses from the third CN/GW 203, the second access network 115, and the HSS+ 123 from the binding info update requests it had sent out previously (illustrated as transmissions 443, 445, and 447). As the first CN/GW 119 receives all of the acknowledgement responses from third CN/GW 203, second access network 115, and the HSS+ 123 from the binding info update requests the first CN/GW 119 previously sent out, the first CN/GW 119 may send a bearer path switch request to the second access network 115 and the third CN/GW 203. Because the third CN/GW 203 and the second access network 115 may now communicate directly, the tunnel between the third CN/GW 203 and the first CN/GW 119 may be released (illustrated as transmissions 449 and 450).

Upon reception of the bearer path switch request (transmissions 449 and 450), a final optimized bearer path may be used for the ongoing session between the first UE 101 and the second UE 103, with the new path comprising the second UE 103, the second access network 115, the third CN/GW 203, the third access network 201, the first UE 101 (represented in FIG. 4 by arrow 451).

By utilizing the HSS+ 121 along with the pre-handoff registration and the packet forwarding tunnel, a smoother handoff of the first UE 101 from the first access network 113 to the third access network 201 may be performed. This may result in less latency along with fewer data packets lost because of the handover.

Although the present invention and its advantages have been described in detail, it should be understood that various changes, substitutions and alterations can be made herein without departing from the spirit and scope of the invention as defined by the appended claims. For example, the user equipment may comprise any type of user equipment that can communicate to each other through the control network layer.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A communication network comprising:
   a control network system comprising a home subscriber database, the home subscriber database configured to bind an identity of a first piece of user equipment to a locator of the first piece of user equipment; and
   a first control node/gateway configured to notify the home subscriber database of an update to the locator of the first piece of user equipment.

2. The communication network of claim 1, further comprising an access network layer, the access network layer comprising a first access network in communication with the first control node/gateway.

3. The communication network of claim 2, further comprising a second access network located within the access network layer, the second access network configured to forward data packets to the first access network during a handoff.

4. The communication network of claim 2, wherein the communications network is a heterogeneous network.

5. The method of claim 1, wherein the control network system operates in a split identity and locator architecture.

6. A method of communicating data, the method comprising:
transmitting a pre-handoff registration request from a first gateway in a control network to a second gateway in the control network;
initiating a handoff from the first gateway to the second gateway after the pre-handoff registration request;
binding an identity and a locator; and
storing the binding in a home subscriber database.

7. The method of claim 6, wherein the control network operates in an identity-locator split architecture.

8. The method of claim 6, further comprising transmitting a pre-handoff registration complete message from the second gateway to the first gateway.

9. The method of claim 8, further comprising transmitting the pre-handoff registration complete message from the first gateway to a first user equipment.

10. The method of claim 6, wherein performing the handoff further comprises creating a tunnel between the first gateway and the second gateway.

11. The method of claim 10, wherein the tunnel transmits data packets between the first gateway and the second gateway prior to a completion of the performing the handoff.

12. A method of transmitting data, the method comprising:
transmitting a tunnel request from a first gateway in a control network to a second gateway in the control network;
setting up a tunnel between the first gateway and the second gateway;
transmitting data packets from the first gateway to the second gateway after a handoff from the first gateway to the second gateway has been initiated and prior to the handoff being complete;
binding an identity and a locator; and
storing the binding in a home subscriber database.

13. The method of claim 12, wherein the control network operates in a split identity and locator architecture.

14. The method of claim 12, further comprising transmitting updated binding information to the home subscriber database from the second gateway.

15. The method of claim 12, further comprising transmitting updated binding information to the first gateway from the home subscriber database.

16. The method of claim 12, further comprising transmitting a pre-handoff registration from the first gateway to the second gateway.

17. The method of claim 12, further comprising transmitting a tunnel setup response from the second gateway to the first gateway.

* * * * *